United States Patent
Loman

(10) Patent No.: US 9,689,734 B2
(45) Date of Patent: Jun. 27, 2017

(54) SPLASH SHIELD FOR A FLUID CONTAINMENT SYSTEM OF A VEHICLE

(71) Applicant: GM GLOBAL TECHNOLOGY OPERATIONS LLC, Detroit, MI (US)

(72) Inventor: Jerry D. Loman, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 425 days.

(21) Appl. No.: 14/445,524

(22) Filed: Jul. 29, 2014

(65) Prior Publication Data

US 2016/0031599 A1    Feb. 4, 2016

(51) Int. Cl.
| | |
|---|---|
| *G01F 23/30* | (2006.01) |
| *G01F 23/00* | (2006.01) |
| *B60S 1/50* | (2006.01) |
| *B65D 25/02* | (2006.01) |

(52) U.S. Cl.
CPC .............. *G01F 23/303* (2013.01); *B60S 1/50* (2013.01); *B65D 25/02* (2013.01); *G01F 23/0007* (2013.01)

(58) Field of Classification Search
CPC ............................ G01F 23/0007; G01F 23/303
See application file for complete search history.

(56) References Cited

U.S. PATENT DOCUMENTS

2012/0037657 A1*  2/2012  Mazzotta ............ G01F 23/0007
                                                                 222/1
2013/0160871 A1*  6/2013  Mawhinney ............. B60S 1/50
                                                                 137/409

FOREIGN PATENT DOCUMENTS

| DE | 2854178 A1 | 6/1980 |
|---|---|---|
| EP | 1399342 B1 | 12/2006 |
| FR | 2269382 A1 | 11/1975 |

\* cited by examiner

*Primary Examiner* — Paul West
(74) *Attorney, Agent, or Firm* — Quinn IP Law

(57) ABSTRACT

A fluid containment system includes a container, a sensor, and a splash shield. The container has a bottom and defines an interior configured for holding a volume of fluid. The volume of fluid is variable between a low volume range and a filled range. The sensor is operatively disposed in the interior of the container in spaced relationship to the bottom. The sensor is configured to be at least partially submerged in the fluid only when the volume is in the filled volume range. The splash shield is operatively disposed within the interior of the container at a barrier level defined between the sensor and the bottom. As such, the splash shield is disposed between the sensor and a surface level of the fluid when a level of the fluid is less than the barrier level to provide a barrier to prevent fluid from splashing onto the sensor.

20 Claims, 2 Drawing Sheets

SPLASH SHIELD FOR A FLUID CONTAINMENT SYSTEM OF A VEHICLE

TECHNICAL FIELD

The present disclosure is related to a splash shield configured for use with a fluid containment system of a vehicle.

BACKGROUND

Vehicles include fluid reservoirs that contain a fluid, such as washer fluid, oil, gasoline, engine coolant, and the like. Vehicle windshield washer systems typically include a washer fluid reservoir mounted in the engine compartment. A motor-driven pump typically draws washer fluid from the reservoir and pumps the washer fluid under pressure to spray nozzles in the vicinity of the windshield to spray the washer fluid over the windshield. During inclement weather, rain or snow may accumulate on the windshield.

SUMMARY

One possible aspect of the disclosure provides a fluid containment system including a container, a sensor, and a splash shield. The container has a bottom and defines an interior configured for holding a volume of fluid. The volume of fluid is variable between a low volume range and a filled range. The sensor is operatively disposed in the interior of the container in spaced relationship to the bottom. The sensor is configured to be at least partially submerged in the fluid only when the volume is in the filled volume range. The splash shield is operatively disposed within the interior of the container at a barrier level defined between the sensor and the bottom. As such, the splash shield is disposed between the sensor and a surface level of the fluid when a level of the fluid is less than the barrier level to provide a barrier to prevent fluid from splashing onto the sensor.

In another aspect of the disclosure, a vehicle includes a controller and a fluid containment system. The fluid containment system is an operative communication with the controller. The fluid containment system includes a container, a sensor, and a splash shield. The volume of fluid within the container is variable between a low volume range and a filled volume range. The sensor is operatively disposed in the interior of the container in spaced relationship to the bottom. The sensor is configured to be at least partially submerged in the fluid only when the volume is in the filled volume range. The sensor is operatively connected to the controller and is configured to transmit a signal to the controller when the sensor detects the volume is in the low volume range. The splash shield is operatively disposed within the interior of the container at a barrier level defined between the sensor and the bottom. As such, the splash shield is disposed between the sensor and a surface level of the fluid when a level of the fluid is less than the barrier level to provide a barrier to prevent fluid from splashing onto the sensor.

The above features and advantages and other features and advantages of the present teachings are readily apparent from the following detailed description of the best modes for carrying out the present teachings when taken in connection with the accompanying drawings.

DETAILED DESCRIPTION

Figure 1:
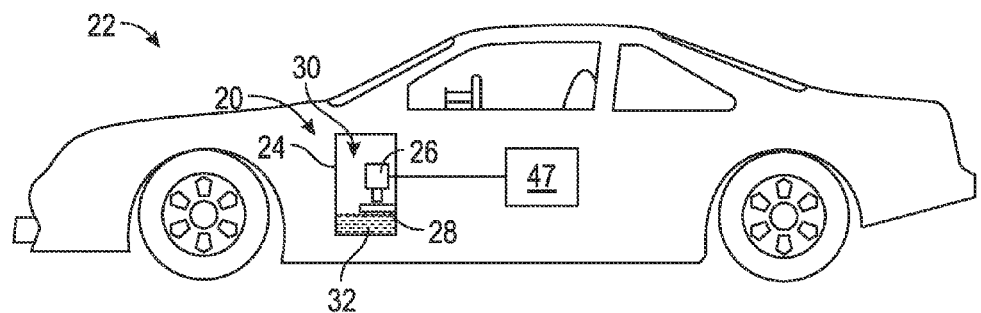
FIG. 1 is a schematic diagrammatic view of a vehicle having a fluid containment system.

Referring to the drawings, wherein like reference numbers refer to like components throughout the several Figures, a fluid containment system is shown schematically at 20 in FIG. 1. The fluid containment system 20 may be used within a vehicle 22. It should be appreciated that the fluid containment system 20 is not limited to being used within a vehicle 22, but may be used elsewhere, such as with a boat and the like.

The fluid containment system 20 includes a container 24, a sensor 26, and a splash shield 28. The container 24 defines an interior 30 configured for holding a volume of fluid 32. The fluid 32 may be windshield washer solvent, water, and the like. During operation, a required amount of fluid 32 may be drawn from the container 24 to be sprayed on the windshield, or some other area of the vehicle 22. The container 24 includes a bottom 34 and a top 36, disposed in spaced relationship to the bottom 34. A wall 38 extends between the bottom 34 and the top 36. As such, the top 36, the bottom 34, and the wall 38 cooperate to define the interior 30 of the container 24.

The volume of fluid 32 within the interior 30 is variable between a filled volume range 40 and a low volume range 42. In the filled volume range 40, there is sufficient fluid 32 to operate the fluid containment system 20. The low volume range 42 corresponds to a fluid level 33 ranging between a base level 44 and in intermediate level 46. The base level 44 is proximate the bottom 34 of the container 24 and there is an insufficient volume of fluid 32 within the container 24 to operate the fluid containment system 20. The intermediate level 46 corresponds to a fluid level 33 where the volume of fluid 32 is first considered to be in the low volume range 42, but where the fluid containment system 20 is still operable. The filled volume range 40 corresponds to the fluid level 33 being between greater than the intermediate level 46 and a fill level 35. The fill level 35 is proximate the top 36 of the container 24. The sensor 26 is operatively disposed within the interior 30 of the container 24 and configured to determine when the volume of fluid 32 is in the low volume range 42, i.e., the level of fluid is between the base level 44 and the intermediate level 46, and, in turn, transmit a signal S26 to a vehicle controller 47 indicating the low volume of fluid 32. Therefore, the sensor 26 is positioned to determine when the volume of fluid 32 is reduced to a level that is no longer in the filled volume range 40.

Figure 2:
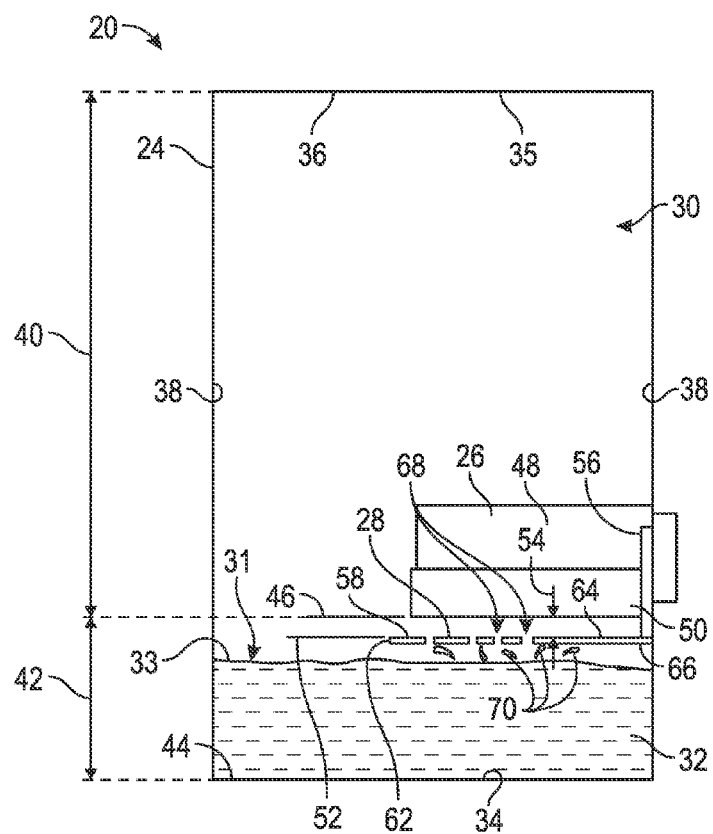
FIG. 2 is a schematic partial cross-sectional perspective side view of the fluid containment system including a splash shield and a sensor.

The sensor 26 may be a fluid level sensor that includes a housing 48 and a float 50, which is operatively supported by the housing 48. In use, the sensor 26 may be operatively disposed within the interior 30 of the container 24 such that the container 24 operatively supports the sensor 26. Referring to FIG. 2, the sensor 26 may be operatively supported by the wall 38. The float 50 may be a barrel float, toggle float, magnetic float, and the like that is configured to move relative to the housing 48. The float 50 may be made of a material having a higher specific gravity than the fluid 32 in the container 24 to allow the float 50 to float within the fluid 32. The housing 48 is configured to remain stationary within the container 24, while the float 50 is configured to float in the fluid 32, relative to the housing 48. More specifically, the float 50 is configured to float within the fluid 32 when the level of the fluid is greater than the intermediate level 46. However, the float 50 is configured to not float when the level of the fluid is less than or equal to the intermediate level 46. As such, when the float 50 is not floating, a signal S26 may be sent from the sensor 26 to the controller to indicate the volume of fluid 32 has reached the low volume range 42.

The splash shield 28 is operatively disposed within the interior 30 of the container 24 between the sensor 26 and the bottom 34 of the container 24. As such, at least a portion of the splash shield 28 is disposed at a barrier level 52, located between the intermediate level 46 and the bottom 34 of the container 24, so as to provide a barrier between a surface level 31 of the fluid 32 and the sensor 26 when the level of fluid is below the barrier level 52. The barrier level 52, and therefore at least a portion of the splash shield 28, may be spaced from the sensor 26 such that a gap 54 is defined between the sensor 26 and the barrier level 52. In one embodiment, the distance may be between 1 millimeter (mm) and 25 millimeters (mm). More preferably, the distance may be between 5 mm and 19 mm. The splash shield 28 is configured to provide a barrier to splashes 70 of fluid 32 that may result from a harmonic event, such as while driving the vehicle 22 without the splash shield 28, at low temperatures, the splashes 70 of fluid 32 onto the sensor 26 may result in the formation of slush or ice crystals on or around the sensor 26, causing the float 50 to not move relative to the housing 48. As such, the slush or ice crystals may prevent the sensor 26 from sending a signal when required and/or may cause the sensor 26 to send a signal when not required. Therefore, by preventing the fluid 32 from splashing 70 onto the sensor 26 during harmonic events, the formation of slush or ice crystals on the sensor 26 may be reduced or otherwise prevented.

Figure 3:
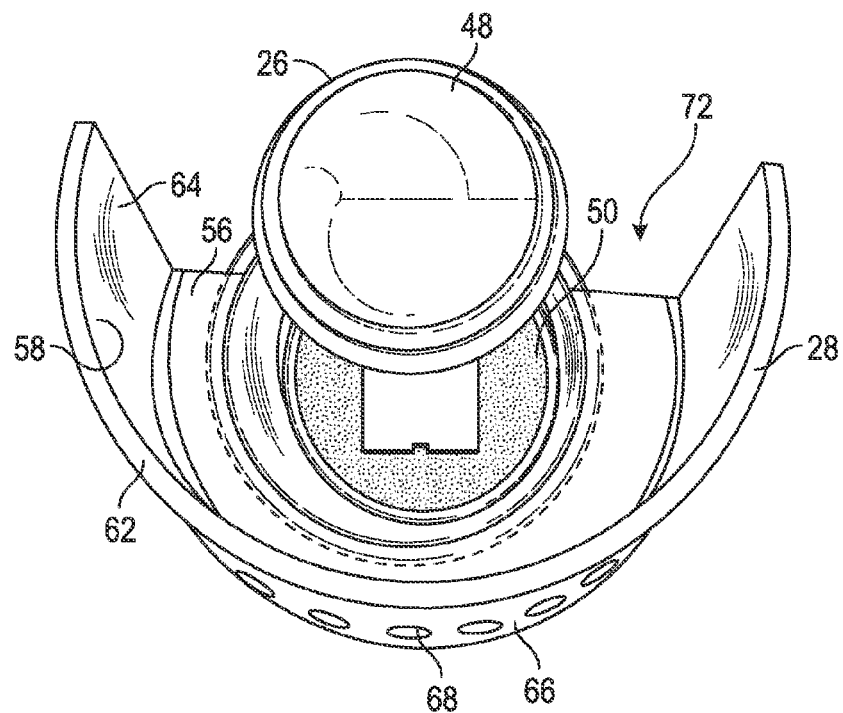
FIG. 3 is a schematic side view of the splash shield and sensor of FIG. 2.
Figure 4:
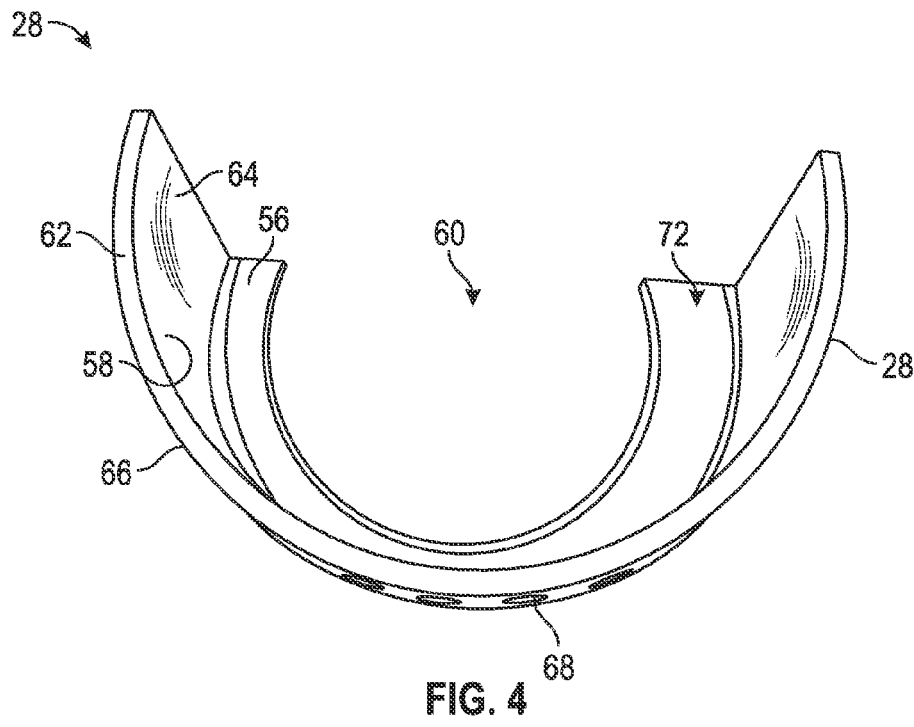
FIG. 4 is a side view of the splash shield of FIGS. 2 and 3.

Referring to the embodiment of FIGS. 3 and 4, the splash shield 28 includes an attachment section 56 and a barrier section 58. The attachment section 56 is configured for operative attachment to the container 24. The barrier section 58 provides the barrier between the sensor 26 and the fluid 32, when the fluid 32 is below the barrier level 52. Referring to FIG. 4, the attachment section 56 defines a slot 60. When the splash shield 28 is attached to the container 24, the housing 48 of the sensor 26 may be received within the slot 60, as shown in FIGS. 2 and 3. In this embodiment, the housing 48 of the sensor 26 is mated to the attachment section 56 such that the housing 48 is fitted within the slot 60, via an interference fit. It should be appreciated, however, that the sensor 26 may be attached to the splash shield 28 in other ways. Alternatively, it should also be appreciated that the attachment section 56 of the splash shield 28 may be directly attached to the container 24, e.g., attached to the wall 38 of the container 24.

With continued reference to FIG. 3, the barrier section 58 longitudinally extends from the attachment section 56 to a distal end 62. The barrier section 58 may extend in generally perpendicular relationship to the attachment section 56. The barrier section 58 includes a first surface 64 and a second surface 66, opposing the first surface 64. The barrier section 58 may define a plurality of openings 68 between the first surface 64 and the second surface 66. The openings 68 allow the fluid 32 to flow through, or otherwise drain from, the first surface 64, through the second surface 66, of the barrier section 58 as the volume of fluid 32 within the container 24 is decreased. Likewise, the openings 68 may allow the fluid 32 to flow through the barrier section 58 as the container 24 is filled, i.e., from the second surface 66 to the first surface 64. It should be appreciated that the openings 68 are sized so as to prevent the splashes 70 of the fluid 32 from going through the barrier section 58, toward the sensor 26, when the level of the fluid is less than the barrier level 52. The openings 68 are sized as a function of a viscosity of the fluid 32. Therefore, the openings 68 may be sized to be larger when used with higher viscosity fluid 32 and lower when used with lower viscosity fluid 32. In one embodiment, the openings 68 have a diameter of between 2.0 mm and 4.0 mm. More preferably, the openings 68 have a diameter of between 2.5 mm and 3.5 mm. It should be appreciated that openings 68 having other sizes and shapes may also be used, so long as the openings 68 to not allow the splashes 70 of fluid from going through the barrier section 58. The splash shield 28 is attached relative to the sensor 26 such that the barrier section 58 is disposed between the intermediate level 46 and the bottom 34 of the container 24. As such, at least a portion of the splash shield 28 is configured to be disposed between a surface 31 of the fluid 32 and the sensor 26 when the fluid level 33 is below the barrier level 52.

With continued reference to FIG. 3, the barrier section 58 may define a channel 72. The barrier section 58 may be semi-circular, as viewed in cross-section, to define a u-shaped channel 72. It should be appreciated, that the barrier section 58 may have other cross-sectional shapes to define channels 72 having other cross-sectional shapes. At least a portion of the barrier section 58 may partially extend into the channel 72.

In another embodiment, the splash shield 28 may be integrally formed within a tool (not shown), while blow molding the container 24. More specifically, a blade (not shown) may be inserted into parison. As known to those of skill in the art, the parison is a hollow tube of plastic to be formed into the hollow container 24, by blow molding. After insertion of the blade, the tool is closed and cycles. As the tool is cycling, the blade is removed, leaving a shelf in the place of the blade. As such, the splash shield 28 may be an integral part of the container 24. It should be appreciated that the shelf is positioned to be at the barrier level 52 within the container 24.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A fluid containment system comprising:
   a container having a bottom;
   wherein the container defines an interior configured for holding a volume of fluid;
   wherein the volume of fluid is variable between a low volume range and a filled volume range;
   a sensor operatively disposed in the interior of the container in spaced relationship to the bottom;
   wherein the sensor is configured to be at least partially submerged in the fluid only when the volume is in the filled volume range; and
   a splash shield operatively disposed within the interior of the container at a barrier level defined between the sensor and the bottom such that the splash shield is disposed between the sensor and a surface level of the fluid when a level of the fluid is less than the barrier level to provide a barrier to prevent the fluid from splashing onto the sensor;

wherein the splash shield includes a barrier section extending longitudinally to a distal end;
wherein at least a portion of the barrier section is operatively disposed at the barrier level;
wherein the barrier section includes a first surface and a second surface, opposite the first surface;
wherein the barrier section is configured to provide a barrier between the sensor and the fluid when the surface level of the fluid is less than the barrier level; and
wherein the barrier section has a semi-circular cross-sectional shape defining a channel.

2. A fluid containment system, as set forth in claim 1, wherein the sensor is configured to sense a physical property of the fluid.

3. A fluid containment system, as set forth in claim 2, wherein the sensor is configured to sense that the volume of fluid within the container is one of the low volume range and the filled volume range.

4. A fluid containment system, as set forth in claim 3, wherein the sensor is a fluid level sensor including a housing and a float operatively supported by the housing;
wherein the float is configured to float in the fluid such that the float moves relative to the housing when the volume is in the filled volume range.

5. A fluid containment system, as set forth in claim 1, wherein at least a portion of the splash shield is disposed at the barrier level in spaced relationship to the sensor such that a gap is defined between the barrier level and the sensor.

6. A fluid containment system, as set forth in claim 5, wherein the gap is between 1 millimeter and 25 millimeters.

7. A fluid containment system, as set forth in claim 1, wherein the barrier section defines at least one opening between the first surface and the second surface such that the at least one opening allows fluid to flow through the barrier section.

8. A fluid containment system, as set forth in claim 1, wherein at least a portion of the sensor partially extends into the channel.

9. A fluid containment system, as set forth in claim 1, wherein the splash shield further includes an attachment section;
wherein the barrier section longitudinally extends generally perpendicularly from the attachment section to the distal end;
wherein the attachment section defines a slot; and
wherein the sensor is received within the slot such that the splash shield is operatively attached to the sensor.

10. A vehicle comprising:
a controller; and
a fluid containment system in operative communication with the controller; the fluid containment system including:
a container having a bottom;
wherein the container defines an interior configured for holding a volume of fluid;
wherein the volume of fluid is variable between a low volume range and a filled volume range;
a sensor operatively disposed in the interior of the container in spaced relationship to the bottom;
wherein the sensor is configured to be at least partially submerged in the fluid only when the volume is in the filled volume range;
wherein the sensor is operatively connected to the controller and configured to transmit a signal to the controller when the sensor detects the volume is in the low volume range; and
a splash shield operatively disposed within the interior of the container at a barrier level defined between the sensor and the bottom such that the splash shield is disposed between the sensor and a surface level of the fluid when a level of the fluid is less than the barrier level to provide a barrier to prevent the fluid from splashing onto the sensor;
wherein the splash shield includes a barrier section extending longitudinally to a distal end;
wherein at least a portion of the barrier section is operatively disposed at the barrier level;
wherein the barrier section includes a first surface and a second surface, opposite the first surface;
wherein the barrier section is configured to provide a barrier between the sensor and the fluid when the surface level of the fluid is less than the barrier level; and
wherein the barrier section has a semi-circular cross-sectional shape defining a channel.

11. A vehicle, as set forth in claim 10, wherein the sensor is a fluid level sensor including a housing and a float operatively supported by the housing;
wherein the float is configured to float in the fluid such that the float moves relative to the housing when the volume is in the filled volume range.

12. A vehicle, as set forth in claim 10, wherein at least a portion of the splash shield is disposed at the barrier level in spaced relationship to the sensor such that a gap is defined between the barrier level and the sensor.

13. A vehicle, as set forth in claim 12, wherein the gap is between 1 millimeter and 25 millimeters.

14. A vehicle, as set forth in claim 10, wherein the barrier section defines at least one opening between the first surface and the second surface such that the at least one opening allows fluid to flow through the barrier section.

15. A vehicle, as set forth in claim 10, wherein at least a portion of the sensor partially extends into the channel.

16. A vehicle, as set forth in claim 10, wherein the splash shield further includes an attachment section;
wherein the barrier section longitudinally extends generally perpendicularly from the attachment section to the distal end;
wherein the attachment section defines a slot; and
wherein the sensor is received within the slot such that the splash shield is operatively attached to the sensor.

17. A fluid containment system comprising:
a container having a bottom;
wherein the container defines an interior configured for holding a volume of fluid;
wherein the volume of fluid is variable between a low volume range and a filled volume range;
a sensor operatively disposed in the interior of the container in spaced relationship to the bottom;
wherein the sensor is configured to be at least partially submerged in the fluid only when the volume is in the filled volume range; and
a splash shield operatively disposed within the interior of the container at a barrier level defined between the sensor and the bottom such that the splash shield is disposed between the sensor and a surface level of the fluid when a level of the fluid is less than the barrier level to provide a barrier to prevent the fluid from splashing onto the sensor;
wherein the splash shield includes an attachment section and a barrier section extending longitudinally generally perpendicularly from the attachment section to a distal end;

wherein at least a portion of the barrier section is operatively disposed at the barrier level;

wherein the barrier section includes a first surface and a second surface, opposite the first surface;

wherein the barrier section is configured to provide a barrier between the sensor and the fluid when the surface level of the fluid is less than the barrier level;

wherein the attachment section defines a slot; and wherein the sensor is received within the slot such that the splash shield is operatively attached to the sensor.

18. A fluid containment system, as set forth in claim 17, wherein the sensor is configured to sense a physical property of the fluid.

19. A fluid containment system, as set forth in claim 18, wherein the sensor is a fluid level sensor including a housing and a float operatively supported by the housing;

wherein the float is configured to float in the fluid such that the float moves relative to the housing when the volume is in the filled volume range.

20. A fluid containment system, as set forth in claim 17, wherein at least a portion of the splash shield is disposed at the barrier level in spaced relationship to the sensor such that a gap is defined between the barrier level and the sensor.

\* \* \* \* \*